(No Model.)

Z. L. HAYDEN.
HOOF GAGE.

No. 513,574. Patented Jan. 30, 1894.

Witnesses:
Inventor
Zerah L. Hayden.
By James J. Sheehy
Attorney

UNITED STATES PATENT OFFICE.

ZERAH L. HAYDEN, OF CARROLL, IOWA.

HOOF-GAGE.

SPECIFICATION forming part of Letters Patent No. 513,574, dated January 30, 1894.

Application filed March 23, 1893. Serial No. 467,889. (No model.)

*To all whom it may concern:*

Be it known that I, ZERAH L. HAYDEN, a citizen of the United States, residing at Carroll, in the county of Carroll and State of Iowa, have invented certain new and useful Improvements in Horseshoe Machines, to be used in paring horses' hoofs in getting the proper angle, and in getting a perfectly-level surface; and I do declare the following to be a full, clear, and exact description of the invention, such as will enable others skilled in the art to which it appertains to make and use the same, reference being had to the accompanying drawings, and to marks of reference thereon, which form a part of this specification.

This invention relates to a device to be used in the preparation of horses' feet for the reception of shoes.

The prime object of the invention is to provide a device by which the hoof may be measured so that it may be pared to any desired angle, and such measurement as taken from one hoof may be used for measuring the hoof of another foot on the same animal, so that they may all present a uniform appearance when shod; thereby presenting a neatness in shoeing.

A further object of the invention is to provide a device which is adjustable both laterally and vertically, or at right angles to the lateral adjustment, whereby the said device may be set for a hoof desired to be pared at a right angle, or at an angle greater or less than a right angle.

Other objects and advantages will appear from the following description and claims when taken in connection with the accompanying drawings, in which—

Figure 1:
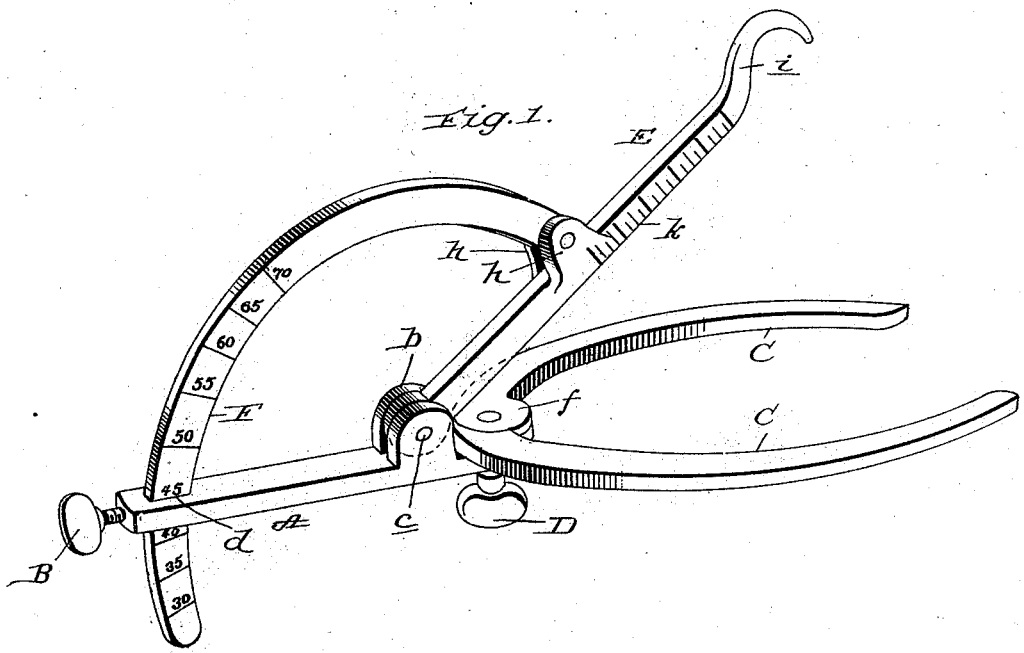
Figure 2:
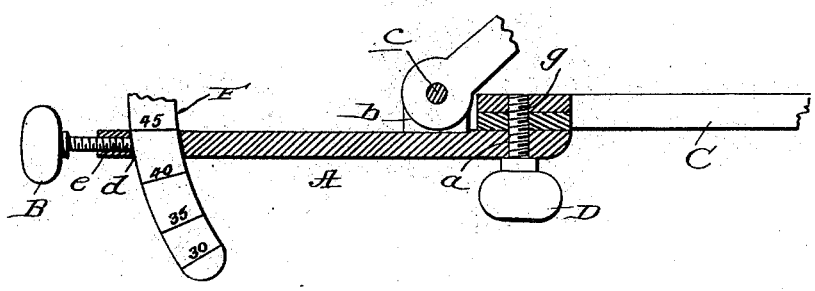

Figure 1, is a perspective view of my improved device illustrating the same as set for a hoof to be pared on the bottom at an angle of forty-five degrees, and Fig. 2, is a broken, sectional view of the same.

Referring by letter to said drawings: A, indicates the main bar or base of my improved device. This bar which is of a suitable length and width is provided at one end with a transverse-screw tapped aperture $a$, and on its upper side, adjacent to said end, with lug journals $b$, having transverse holes $c$, for the reception of a pintle, for a purpose which will be presently described. This bar is furthermore provided near its opposite end with a transverse-elongated aperture $d$, and is provided at the extreme end, and at right angles to the slot $d$, with a screw tapped aperture $e$, to receive a thumb screw B, adapted to intersect the slot $d$, when turned inwardly.

C, indicates two similar, curved bars or sections, which together form in outline, the appearance of a horseshoe. These two sections are provided at their contiguous ends with enlargements $f$, which are flattened so as to snugly overlap each other, and are provided with aligned, screw-threaded apertures $g$, which register with the aperture $a$, in the bar A, and these three apertures receive a threaded thumb screw D, whereby they may be adjusted laterally and adjustably secured to the bar A.

E, indicates an arm. This arm is perforated at its inner end and hinged between the lug journals $b$, of the bar A, by means of the stud or pintle $c'$. This bar E, is provided at a suitable point in its length on its outer side with two perforated ears or lugs $h$, and is provided at its outer or free end with a hook $i$. The bar is graduated for a sufficient distance of its length, as shown at $k$, for the purpose of measuring the distance from the top of the sections C, which I shall denominate "the horse shoe section."

F, indicates a curvilinear, graduated bar. This bar is pivotally connected at one end between the perforated ears or lugs $h$, of the bar E, and its opposite end plays in the slot $d$, of the bar A; the set screw B, being designed to impinge against the bar F, so as to adjustably secure it and also adjustably secure the bar E, with respect to the bar A.

From the construction described, it will be seen that the section C, may be adjusted laterally by manipulation of the screw D, so as to set said sections in or out according to the size of the shoe to be used, and by the manipulation of the screw B, and the curvilinear graduated bar, the bar E, may be adjusted so as to set and hold the sections C, according to the angle to which the hoof is to be pared; the hook $i$, at the outer end of the bar E, affording a convenient means to receive the finger when the bar has been placed against the hoof or the hair at the top of the hoof.

After the device has been fixed for the angle desired to obtain in the hoof, it is simply necessary to pare such hoof until the device can be fitted thereto; the hoof being placed upon the section C, and the front against the bar E.

Having described my invention, what I claim is—

1. A device to be used in the preparation of horses feet for the reception of shoes, comprising a laterally adjustable section, and a section adjustable in a plane at an angle to the laterally adjustable section, substantially as specified.

2. A device to be used in the preparation of horses' feet for the reception of shoes, comprising a laterally-adjustable section adapted to be placed on the under side of a horse's hoof, and a bar adapted to be adjusted upon the front of the hoof, substantially as specified.

3. A device to be used in the preparation of horses' feet for the reception of shoes, comprising a main bar, two curved bars pivotally connected together and to one end of the main bar, and presenting in outline, the appearance of a horse shoe, a graduated bar also pivoted to the main bar, and adapted to be placed against the front of the hoof, and a graduated bar connected with the first named graduated bar and adapted to adjust the same upon the main bar in a plane at an angle to the adjustment of the curved bars, substantially as specified.

4. The improved device for the purposes described, comprising the main bar, having the lug journals on its upper side, the transverse aperture at one end, the elongated slot near the opposite end, and the screw tapped aperture leading from said slot, the bar pivoted at one end in said lug journals and having graduations, the curvilinear graduated bar connected at one end to the first named graduated bar, and its opposite end adapted to pass through the slot in the main bar, the set screw for adjustably securing the curvilinear graduated bar, the two laterally adjustable curved sections secured on the opposite end of the main bar, and the set screw for connecting said sections, substantially as specified.

In witness whereof I have hereunto set my hand this 3d day of June, 1892.

Z. L. HAYDEN.

Witnesses:
M. W. BEACH,
A. E. BEACH.